May 19, 1970    A. GURRIES    3,512,282
CONVEYOR TYPE LOADER
Filed April 12, 1965    5 Sheets-Sheet 1
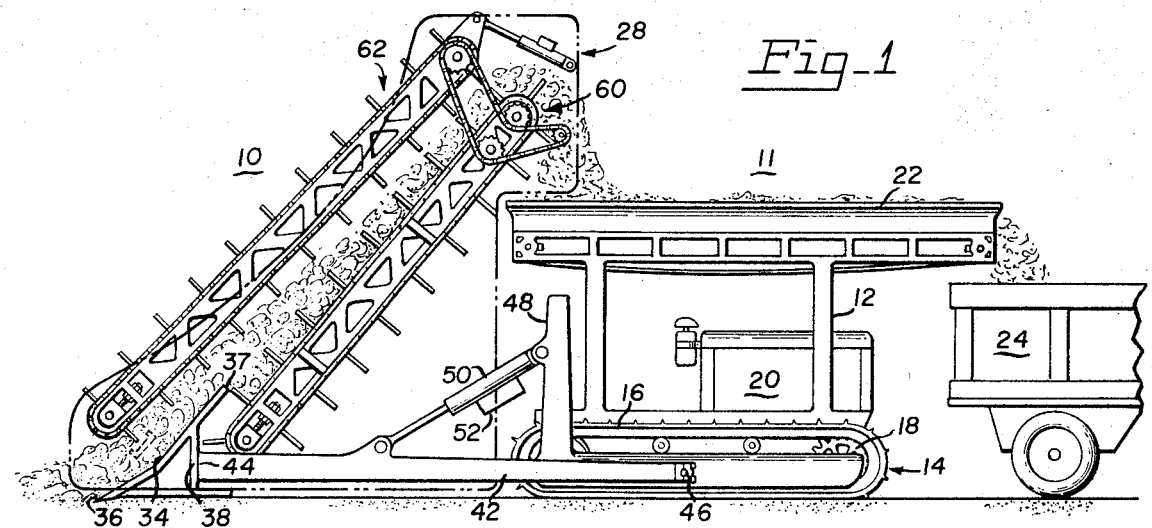
Fig_1
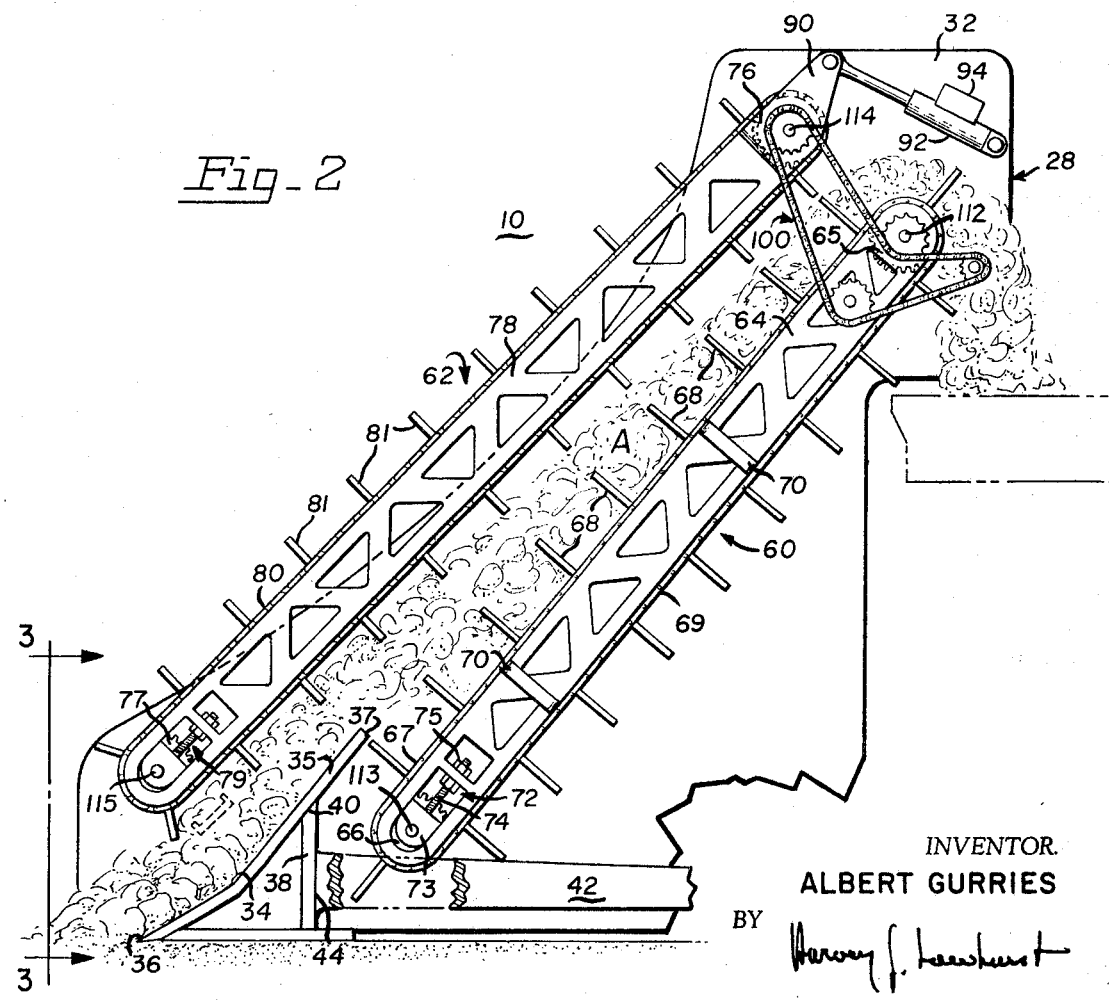
Fig_2
INVENTOR.
ALBERT GURRIES
BY
ATTORNEY May 19, 1970 A. GURRIES 3,512,282
CONVEYOR TYPE LOADER
Filed April 12, 1965 5 Sheets-Sheet 2
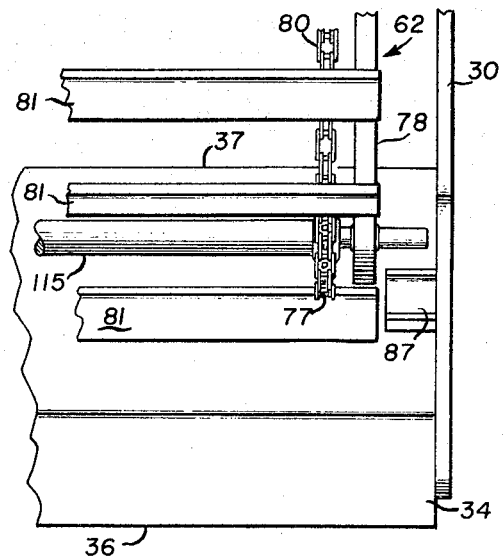
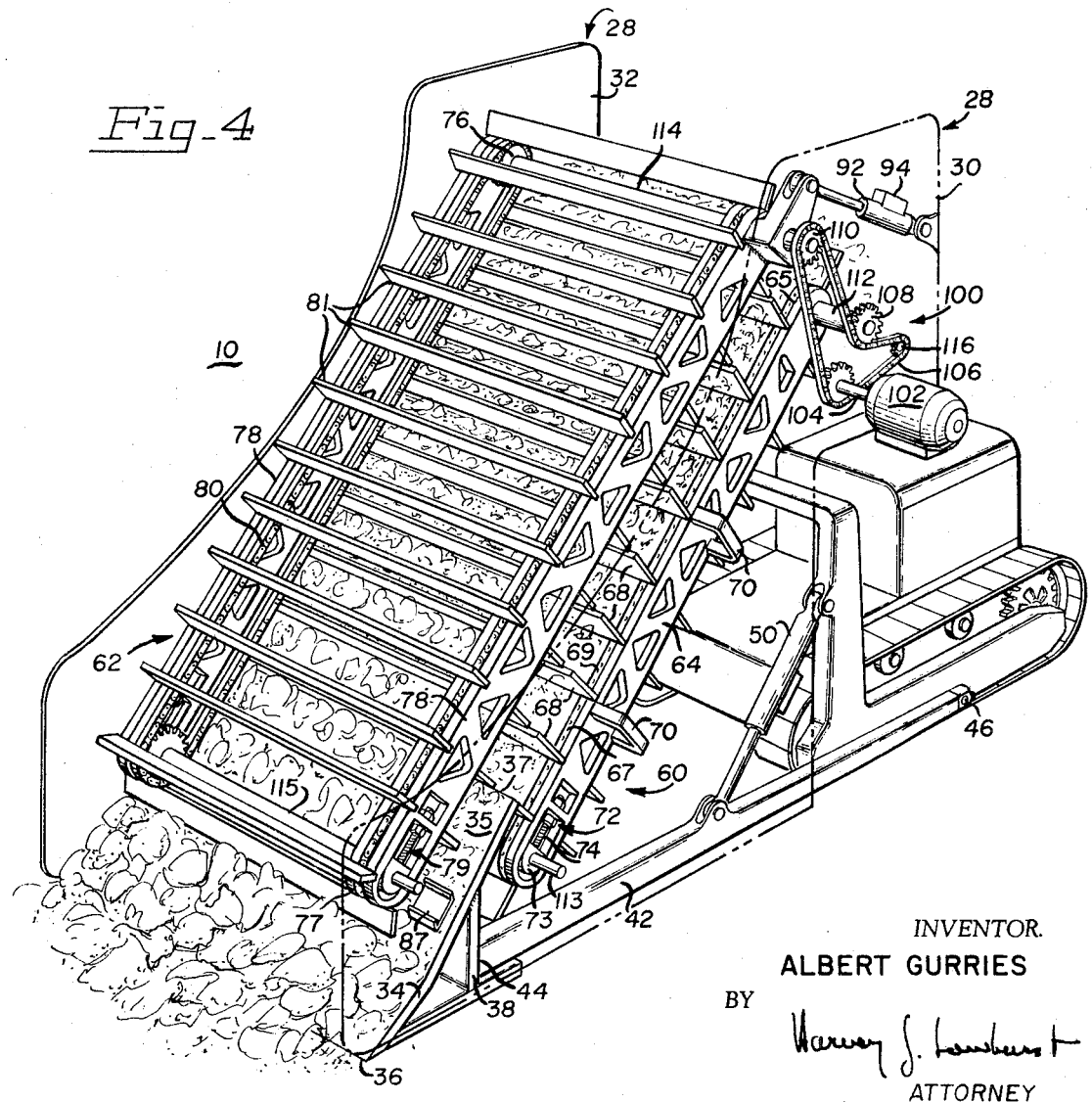
INVENTOR.
ALBERT GURRIES
BY
ATTORNEY

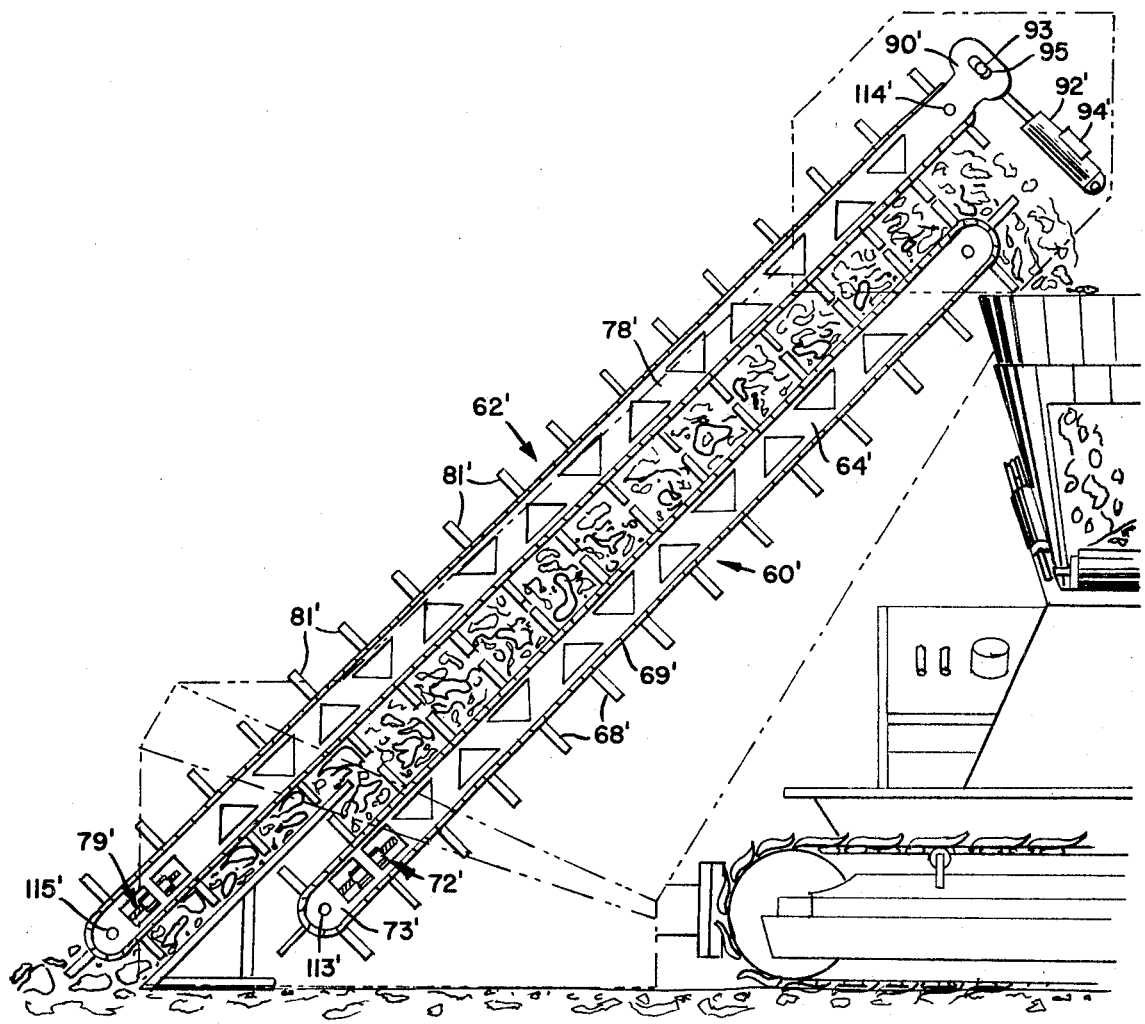
Fig_5

May 19, 1970      A. GURRIES      3,512,282
CONVEYOR TYPE LOADER
Filed April 12, 1965      5 Sheets-Sheet 4
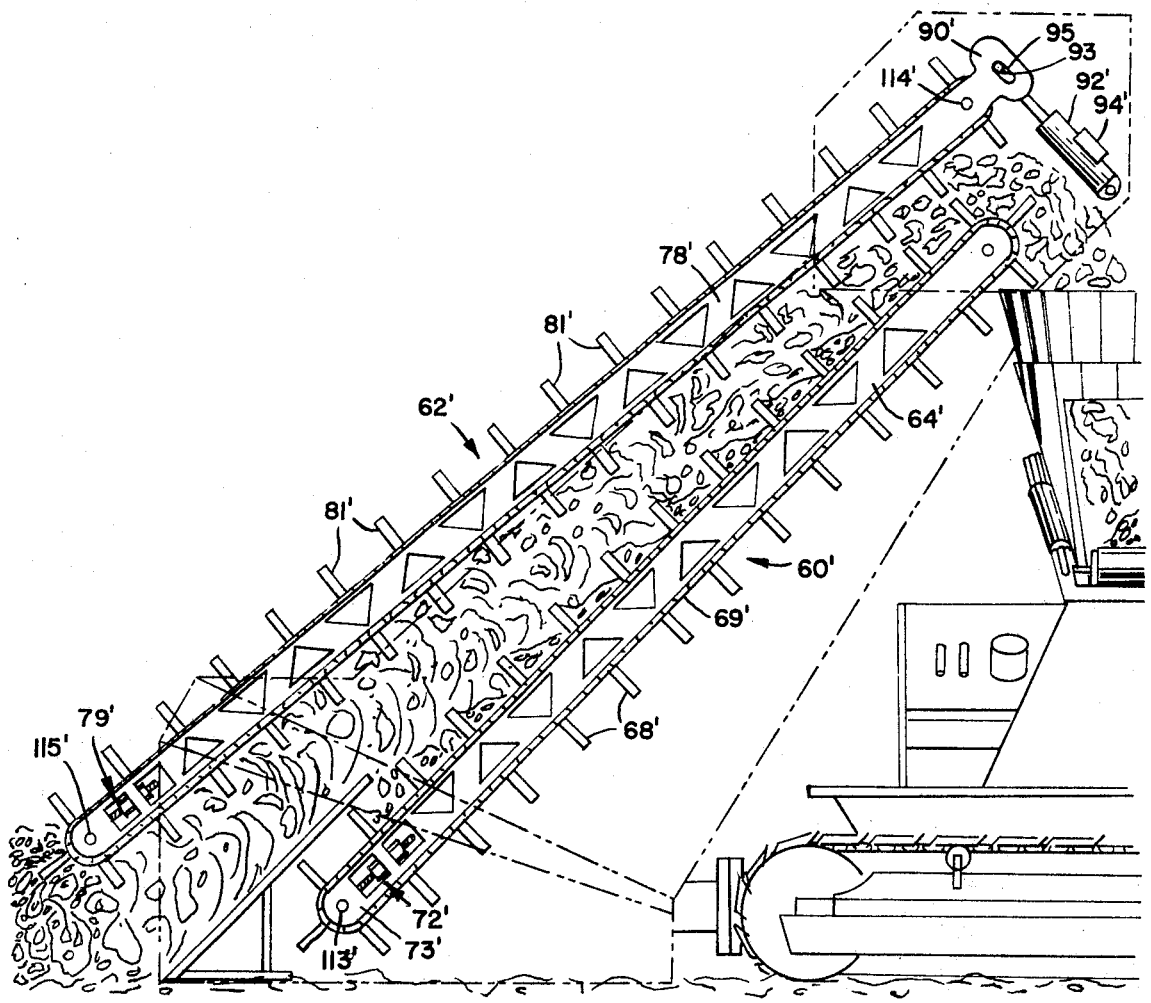
Fig_6
*INVENTOR.*
ALBERT GURRIES

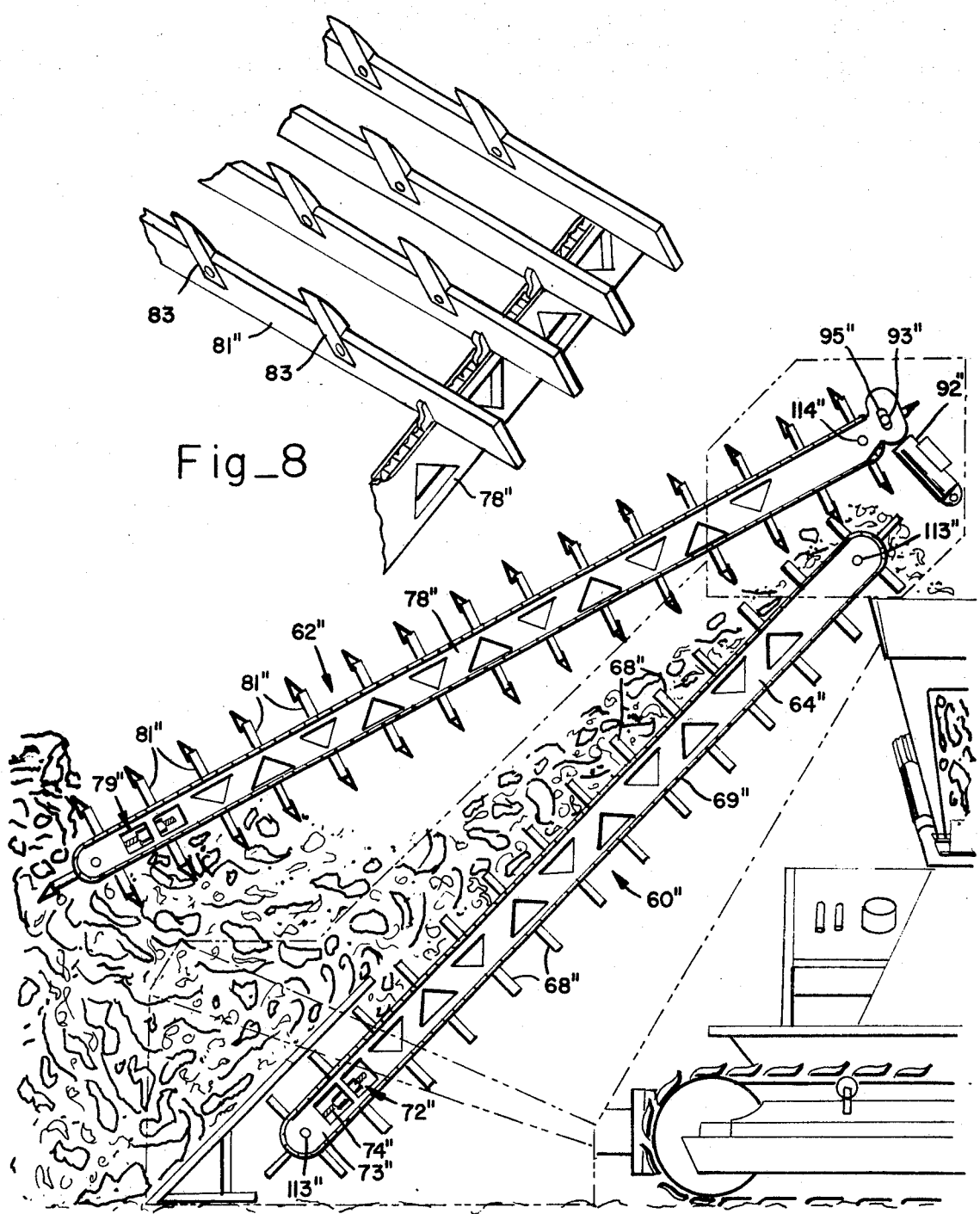

3,512,282
CONVEYOR TYPE LOADER
Albert Gurries, Gilroy, Calif., assignor to Gurries Manufacturing Co., San Jose, Calif., a corporation of California
Continuation-in-part of application Ser. No. 256,462, Feb. 5, 1963. This application Apr. 12, 1965, Ser. No. 449,376
Int. Cl. E02f 5/06; B65g 65/06
U.S. Cl. 37—101
1 Claim

ABSTRACT OF THE DISCLOSURE

A self-loading, conveyor-type loader including a mobile frame having an earth-working scraper blade mounted at the forward end of the frame and two cooperating powered conveyors spanning the blade so that the upper conveyor pushes earth collected on the blade thereover onto the lower conveyor whereupon both conveyors cooperatively move the earth upwardly for subsequent disposal.

---

The present application constitutes a continuation-in-part of my prior application, entitled, "Conveyor Type Loader," filed Feb. 5, 1963, under Ser. No. 256,462, and now abandoned.

This invention relates to conveyor type loaders, and more particularly to a loader for picking up loose earth, rocks, gravel, and the like, either after such material has been loosened by an independent operation or is loosened by the loader unit itself.

Heretofore, one of the problems encountered in the heavy construction industry, whether in connection with the cutting of a level roadbed, the grading of a building site, the digging of a canal or the leveling and cleaning up of a surface, was the removal of the material cut from the ground by the earth working tool. For example, in case of a scraper, the earth cut by the scraper blade in leveling a section of roadway to the desired depth and grade collects in front of the blade so that the blade also has to perform the loading operation. More particularly, the scraped material is pushed up along the blade in a loading pan so that a portion of the available pushing power is diverted for loading and a substantial portion of the time is spent in leaving the cut in order to unload the loading pan. Additionally, the loaded material exerts a variable and constantly increasing force on the blade as the pan gets fuller which causes unwanted variations in the cut taken by the scraper.

Another problem faced by the construction industry in connection with the leveling of construction sites and the like is its inability to level directly to a permanent embankment such as a wall or the like. Scrapers known heretofore usually had their earth working tool placed somewhere intermediate their front and rear portions to facilitate the pushing and subsequent removal of the cut earth. Accordingly, with machines of this type, it was impossible to extend the level to the abutment and additional equipment had to be employed to accomplish this task.

It is therefore a primary object of this invention to provide a self-loading conveyor type loader.

It is another object of this invention to provide an earth working machine in which the worked earth is continually removed from the earth working tool so that the load on the tool is substantially balanced.

It is another object of this invention to provide a means for continually removing worked earth, dirt, rocks, and the like from the earth working tool of a machine without using the power applied to the earth working tool for such removal.

It is another object of this invention to provide a conveyor type loader which self-loads loose material from an earth working tool for suitable disposal, without utilizing any of the power applied to the earth working tool.

It is a further object of this invention to provide a conveyor type loader which positively engages material worked lose by a scraper blade and which conveys it away from the working tool by raising the same for suitable dumping.

It is still another object of this invention to provide an earth working machine including a conveyor type loader which continually removes worked earth from the earth working tool with substantially no, or only very little, assistance from the earth working tool thereby permitting substantially all available pushing power to be applied to the tool.

It is still a further object of this invention to provide an earth working machine for cutting a level directly against an abutment.

It is also an object of this invention to provide a new and novel conveyor type loader utilizing a pair of closely spaced conveyors operating in synchronism in which one conveyor pushes the loose earth upwards onto the other conveyor.

It is still a further object of this invention to provide a pair of closely spaced conveyors operated in synchronism having aligned conveyor blades which form moving compartments.

Yet another object of this invention is to provide for the free pivotal motion of the upper end of one of the pair of closely spaced conveyors so that its lower end can automatically move towards or away from the lower end of the other conveyor to accommodate variant soil loads.

In accordance with another aspect of the invention, it is a further object to provide cutting or digging teeth on the outermost of the spaced conveyors to enable performance of both a digging and loading operation.

It is still a further object of this invention to provide a conveyor type loader capable of positively engaging the material loosened by an earth working tool at the instant it is loosened from the ground so that the load applied to the tool by the loosened material remains substantially constant.

It is still another object of this invention to provide an improved conveyor type loader having a loading capacity greater than known heretofore and which is capable of engaging large rocks or similar solid objects without damage to itself.

It is also an object of this invention to provide a scraper in which the scraper blade is continually unloaded in such a manner that the amount of loose material thereon is substantially constant.

In a preferred embodiment of this invention an earth working machine is provided having its working tool mounted ahead of its forward traction means. A first upwardly and rearwardly inclined conveyor is mounted with its lower end portion just behind the working tool so that the earth can be moved upward along the working tool to spill onto the first conveyor. A second upwardly and rearwardly inclined conveyor is mounted substantially parallel to and in front of the first conveyor to overlie the same. The lower end portion of the second conveyor overlies a portion of the working tool so that the conveyor blades, when moving upwards, scoop up and transport loose earth along the extension of the working tool to its upper edge for spilling onto the first conveyor.

A slightly modified arrangement mounts the second conveyor in a somewhat extended disposition so that it overlies substantially all of the surface of the working tool.

The first and second conveyor means are provided with conveyor blades (or aprons) which may be aligned with one another and driven in synchronism so that large three-sided moving compartments are formed for conveying loose earth and larger rocks. The top and bottom of such a compartment are formed by a pair of aligned and adjacent conveyor blades and the third side is provided by the conveyor belt of the first conveyor means.

In this manner the loose material collecting upon the tool remains small and constant since any excess is continually scooped up by the second conveyor means. Accordingly, very little power is diverted from the scraping operations, no time is lost by unloading, and accurate control of the blade is possible.

In accordance with a modified embodiment of the invention, the second conveyor means mounts earth cutting teeth on the conveyor blades so that a combined cutting and conveying function is provided.

Other objects and a better understanding of the invention may be had by reference to the following description, taken in conjunction with the accompanying drawings, in which:

FIG. 1 is an elevational side view of a conveyor type loader, mounted upon an earthworking device for removing loose earth from its earthworking tool, constructed in accordance with this invention;

FIG. 2 is an enlarged elevational side view of the conveyor type loader of FIG. 1;

FIG. 3 is a view taken along line 3—3 of FIG. 2;

FIG. 4 is a perspective side view of the conveyor type loader of FIGS. 1 and 2;

FIG. 5 is a side elevational view of a conveyor type loader constituting a modified embodiment of the invention;

FIG. 6 is a side elevational view generally similar to FIG. 5 illustrating a variance in the operational disposition of certain of the elements of the loader;

FIG. 7 is a side elevational view of yet another modified embodiment of the invention incorporating cutting teeth so as to perform a digging and conveying function; and FIG. 8 is a fragmentary perspective view of such cutting teeth and their mounting arrangement.

Referring initially to FIGS. 1, 2, 3, and 4 of the drawing in which like reference characters designate like parts, there is shown a conveyor type loader 10, constructed in accordance with this invention, and mounted to an earthworking machine 11 for removing earth and the like loosened by an earthworking tool. Earthworking machine 11, shown for simplicity's sake in substantially diagrammatical form, comprises essentially a motorized vehicle 12 having ground engagement means generally indicated at 14. Motorized vehicle 12 may, for example, be a heavy tractor of Caterpillar-like vehicle, motorized by means of a suitable drive unit 20 connected to rotate wheels 18 which either engage a suitable endless track 16 as shown or which are provided with suitable tires.

Motorized vehicle 12 supports a horizontal conveyor means 22 above it for transporting material, deposited at its forward end, to its rear end which projects past the rear of support vehicle 12 to drop the material into a cart generally designated as 24.

As will become better understood from the ensuing description of the drawing, motorized vehicle 12 is selected to provide a motorized frame which may be driven over the ground by endless tracks or wheels in the customary manner and which is sufficiently powered to enable a ground engaging working tool to do useful work. Vehicle 12 may also include control means whereby the vehicle bed can be maintained at a selected height, grade and cross grade with respect to its ground engagement means by reference to an external reference wire or platform or the like. For such height, grade and cross grade control, the vehicle bed may be mounted upon its ground engagement means by means of motorized jack screws or hydraulically actuated rams or the like which are adjustable by means of a sensor guided by the external reference. Such control means are well known to those skilled in the art and do not form part of this invention.

A support frame 28, extending forwardly and being vertically movable, is mounted to the forward end of vehicle 12 to carry conveyor type loader 10 and an earthworking tool such as scraper blade 34. More particularly, support frame 28 includes a pair of spaced side plates 30 and 32 suitably connected to vehicle 12 in such a manner as to provide limited vertical motion of its front end. Side plates 30 and 32 may be tied together in a suitable manner to form a rigid integrated frame structure. In case of utilization of a scraper blade 34 as the earth working tool, opposite ends of blade 34 may be welded to opposite side plates 30 and 32. For further rigidity, a cross member 38 having its end portions welded to body plates 30 and 32 and one of its side edges 40 welded to blade 34 may be employed. Blade 34 is provided with a cutting edge 36 for scraping the earth.

A pair of connecting members 42 (only the front one being exposed to view) is welded at 44 to cross member 38 making a rigid connection therewith. The other ends of connecting members 42 are hingeably connected at 46 to vehicle 12. Adjustable length cross-tie members, such as hydraulic rams 50, are pivotally mounted, at opposite ends, to connecting member 42 and to a boss 48 which is rigid with vehicle 12 to control the angular position of hingeably connected member 42 and thereby the vertical height of support frame 28.

Control means, generally indicated at 52, are provided to control the length of hydraulic rams 50. As is immediately seen from an inspection of FIG. 1, as control means 52 is actuated to shorten rams 50, support frame 28 pivots about hinge point 46 to lift blade 34. If control means 52 is actuated to increase the length of rams 50, the opposite effect is achieved and blade 34 is lowered. In operation, control means 52 may be controlled by an external reference level such as a grade wire or platform running parallel to the path of the scraper.

Accordingly then, the earthworking machine described so far comprises a motorized vehicle 12 having a vertically movable support frame 28 mounted to its forward end. Support frame 28 carries an earthworking tool such as blade 34 whose vertical position is controlled by rams 50. As the earthworking machine moves forward, cutting edge 36 cuts the ground to a depth set by the relative extension of rams 50 which are either manually or automatically controlled by an operator or an external reference respectively.

Blade 34 has an upward extension such as a blade skirt 35 which collects the worked earth, rocks or the like as the same are pushed upwards towards blade edge 37. Blade skirt 35 may be integral with blade 34 or may be formed as a separate part so that blade 34, with cutting edge 36, may be replaced if worn out by use.

To remove loose material from blade 34 continually and without diverting useful power from vehicle 12, a pair of conveyor means 60 and 62 are mounted to support frame 28 to scoop up loose material from blade 34 as soon as it accumulates and to convey the same for convenient disposal. Conveyor means 60 is mounted to catch loose material spilled over edge 37 and conveyor means 62 is mounted to engage the loose material, carry it up along blade skirt 35 for spilling over edge 37 onto conveyor means 60, and for forming closed compartments with conveyor means 60 for moving the loose material upwards without friction or spillage for subsequent disposal.

More particularly, conveyor means 60 comprises a pair of spaced frame side members 64 connected by a pair of transversely extending shafts 112 and 113 at opposite ends thereof. Shaft 112 forms the drive shaft and has mounted thereon a pair of toothed wheels 65 rigid with shaft 112. Shaft 113 forms the driven shaft and has mounted thereon a pair of toothed wheels 66. A pair of link chains 67 engage drive wheel 65 and driven wheel 66 on each side of conveyor means 60 and form the frame of the movable conveyor portion. A plurality of transversely extending conveyor blades 68 having opposite ends rigidly connected to the pair of link chains 67, are mounted for equal separation therebetween. A flexible belt 69 of a suitable material, such as plastic, canvas or the like, is affixed at opposite sides to the pair of link chains 67 and to the underside of conveyor blades 68.

It has been found convenient to provide a tensioning adjustment means 72 on the lower end of frame members 64 in the form of a movable bearing engaging driven shaft 113. Tensioning adjustment means 72 may simply comprise a floating shaft bearing 73 moved by a threaded push rod 74 whose length is adjusted by a pair of nuts 75.

Conveyor means 62 may be of similar construction as conveyor means 60 except that, in the preferred embodiment, its length is somewhat greater so it may extend lower, and it does not include a belt. Accordingly, conveyor means 62 comprises a pair of spaced frame members 78 connected at opposite ends by a pair of transverse shafts 114 and 115 which respectively carry a pair of toothed drive wheels 76 and a pair of toothed driven wheels 77. Also, there is provided a tensioning adjustment means 79 for tensioning a pair of link chains 80 engaging toothed wheels 76 and 77. Link chains 80 have mounted thereto transversely extending conveyor blades 81 forming a ladder type conveyor.

Conveyor means 60 may be immovably affixed to side plates 30 and 32 by means of suitable brackets 70. Conveyor means 60 is positioned to incline upwardly and rearwardly with its lower end portion behind skirt 35 and a distance below blade edge 37 sufficient to that an upwardly moving blade 68 can assume a perpendicular position before the preceding blade 68 has cleared edge 37. Conveyor means 60 preferably extends parallel to blade skirt 35 so that the edges of conveyor blades 68 move parallel thereto. Since loose material spills over edge 37 onto conveyor 60, such a placement of conveyor means 60 assures that when one blade clears edge 37, the next blade is already in a position in which its plane is perpendicular to blade skirt 35 to prevent spilled loose material from falling behind blade 34.

Conveyor means 62 is hingedly mounted in support frame 28 by means of drive shaft 114. More particularly, the ends of shaft 114 may be set into bearings suitably located in, or supported by, side plates 30 and 32 so that the inclination of conveyor means 62 can be changed by pivoting the same about the axis of drive shaft 114. The lower end of conveyor means 62 rests against a stop member 87 affixed to side plate 30 as best seen in FIG. 3. As a practical matter, drive shaft 115 may be extended to project from frame member 78 for engaging stop member 87. Stop member 87 is so positioned that, when engaged by drive shaft 115, conveyor means 62 is substantially parallel to conveyor means 60 and spaced therefrom a distance substantially equal to the combined width of conveyor blades 68 and 81. As a practical matter the spacing is usually somewhat greater to allow conveyor blades 81 to freely pass over the front surface of blade skirt 35.

There is also provided a pivot arm 90, integral with conveyor means 62, which is connected, via a hydraulic ram means 92, to support frame 28. Control means 94 are associated with ram means 92 to operate the same to pivot conveyor means 62 about hinge shaft 114. As ram means 92 is shortened, conveyor means 62 is lifted off its rest position (stop means 87) and is rotated in a clockwise direction to assume a selected inclination with respect to conveyor means 60. As a result of such a change of inclination, its lower end, which scoops up loose material is moved away from the front surface of blade 34 allowing larger stones to be lifted. Conveyor blades 81 are preferably, but not necessarily, selected to be narrower in width than conveyor blades 68 for reasons which will hereinafter be explained.

There is also provided a common conveyor drive, generally dicated as 100, for driving both conveyor means 60 and 62 in complete synchronism as best seen in FIG. 4. Conveyor drive 100 comprises a suitable motor 102 having a geared pinion 104 which engages a drive chain 106. Drive chain 106 also engages a pair of chain gears 108 and 110 respectively mounted to conveyor drive shafts 112 and 114. An idler chain gear 116 is suitably mounted for engaging drive chain 106 and keeping the same in engagement with chain gear 108 which is turned in a direction opposite to that of chain gear 110. It is also to be noted that in the preferred embodiment of this invention conveyor blades 68 and 81 not only move in synchronism but also lie in a common plane in the space between conveyor means 60 and 62. More particularly, a pair of adjacent conveyor blades 68 and a pair of adjacent and aligned conveyor blades 81 between conveyor means 60 and 62 form the top and bottom of a three-sided moving compartment A, the third side being formed by belt 69.

In operation, the conveyor blades at the lower end of conveyor means 62 scoop up the loose material worked by blade 34 and lift the same along the skirt of blade 35 until it spills over edge 37 on conveyor means 60, that is, into one of the compartments A. In this manner the earth, rocks, gravel and the like, torn or cut by blade 34 are not left to accumulate in front of blade 34 but are continually moved upwards, first over the front face of blade 34 by conveyor means 62 and then up the space between conveyor means 60 and 62 for eventual disposition as best shown in FIG. 1. In this manner conveyor means 60 is fed by conveyor means 62 which positively pushes dirt, earth, rocks and the like, upwards and thereafter forms a pocket together with conveyor means 60 which conveys the loose material to a point for eventual unloading.

The belt with which conveyor means 60 is covered is preferably made out of a flexible or yieldable material so that large rocks, or the like, which may be clamped between conveyor blades will not damage either conveyor means. Furthermore, by using a pair of spaced conveyor means operated in synchronism, the loose material after leaving the blade is conveyed upwards without friction and therefore with a minimum of effort since both conveyor means move upward at the same rate. While rear conveyor means 60 lifts most of the loose material, front conveyor means 62 feeds the loose material from blade 34 onto rear conveyor means 60 and also enlarges the depth of the compartment of the lower conveyor means to thereby prevent any spillage of loose material. Further, front conveyor means 62, by continually unloading blade 34, maintains a constant and small accumulation of loose material thereon, thereby making possible to accurately control the cut which the scraper takes.

Control means 94, which controls the inclination of conveyor means 62, performs a very important function and enables an operator to adjust the same for optimum loading conditions. For example, in case the loose material includes larger rocks, the lower end portion of conveyor means 62 is raised off blade 34 to permit such rocks to pass over the blade apron. In case of fine gravel, the front end portion is lowered as close to blade 34 as possible so that the space between the edge of conveyor blades 81 and the surface of the collecting surface is a minimum. Accordingly, by providing a conveyor means hingeably supported and adjustably inclinable, the conveyor type loader may be adjusted for optimum operation in accordance with the type, quantity and size of loose material to be loaded.

Also, the fact that the spaces between the conveyor blades of conveyor means 62 are open makes it possible to convey large rocks and the like by the conveyor type loader of this invention since such objects may project into conveyor means 62 between adjacent conveyor blades. Also in the preferred embodiment of this invention, conveyor blades 68 are selected of sufficient width to convey as much material as desired for disposal. Conveyor blades 81, on the other hand, may be selected of less width since its function is basically to load conveyor means 60 and to extend the top and bottom of the moving compartment A. If the width of conveyor blades 81 is too great, it will be more difficult to control the loader for optimum operation for the many different types of loose material to be loaded.

While this invention has been illustrated for use with a scraper it is to be understood that the conveyor type loader may be utilized with a bulldozer which pushes loose material over the ground. Also, and even more importantly, the conveyor type loader of this invention may be utilized for simply loading any type of material from a storage point. For example, this invention makes an ideal self loader for removing grain from a silo by lowering the upper conveyor means with a suitable collecting plate attached thereto into the grain. The upper conveyor means moves the grain, along the collecting surface, to a spilling edge for deposit on the lower conveyor means.

There has been described hereinabove a conveyor type loader in which a pair of conveyor means are operated in synchronism such that opposite conveyor blades move upward in the same direction. The lower end of the two conveyor means straddle an earth working tool from which loose material is to be removed as soon as it accumulates. One conveyor means feeds the other and after being fed, coacts to convey the loose material up an inclined path. In this manner the loose material in front of the scraper blade is maintained constant making possible an accurate control of the cut taken, only a minimum and constant amount of power is diverted from the cutting operation to the loading operation and no time need be taken to unload the scraper.

It will be apparent that many modified arrangements can be envisioned within the scope of the invention, one exemplary modification being shown in FIGS. 5 and 6 which diagrammatically illustrate a conveyor type loader of obvious similarity to that described in detail hereinabove. As a consequence, all structural details of this second embodiment of the invention will not be illustrated or described since reference is available to the previous description of the first embodiment of the invention. Structurally similar parts of this second embodiment will be indicated in the drawings by like numerals with an added prime notation.

Generally the modified embodiment of the invention shown in FIGS. 5 and 6 facilitates use of a conveyor type loader for handling soil loads of considerable variance. More particularly, the structure can be used to assist in a fine grading operation wherein no more than two inches of soil is scraped and subsequently loaded. Alternatively, a soil load having a depth of two feet or more can also be handled. Finally, the loader is arranged to automatically accommodate itself to soil loads which vary in depth during advance of the loader.

In order to carry out the described advantageous functions, the requisite structural modification of the first embodiment is confined to the second conveyor means 62'. Such conveyor means 62' includes a pair of spaced frame members 78' bridged at their upper and lower ends by transverse shafts 114' and 115', respectively, which, in turn, carry at their opposite extremities a pair of link chains 80' having transversely extending conveyor blades 81' mounted thereon at intervals to form a ladder-type conveyor. The upper transverse shaft 114' provides a pivotal mount for the entire conveyor means 62' permitting pivotal swinging of the upper conveyor means towards or away from the lower conveyor means 60'. Such pivotal motion of the upper conveyor means 62' can be actuated by hydraulic ram means 92' which, when fully extended, permits the conveyor means 62' to lie in substantial parallelism with the lower conveyor means 60' and also in substantial parallelism with the scraper blade 34'.

More particularly, in accordance with the additional inventive aspect embodied in this modified arrangement, the hydraulic ram means 92' is connected to a transverse bar 93 which extends laterally into elongated slots 95 in the frame members 78' a short distance above the upper transverse shaft 114' to provide a lost motion mechanism. As a consequence, retraction of the hydraulic ram means 92' will effect a clockwise pivotal motion of the upper conveyor means 62' about the pivot shaft 114' since the lateral bar 93 is positioned at the lower end of the described slots 95. However, because of the existence of the slots 95, if some other force is encountered at the lower end of the conveyor means 62' tending to lift the same, limited pivotal motion is permitted. Accordingly, if the depth of the soil encountered by the advancing blade 34' increases, for example, from the depth illustrated in FIG. 5 to that shown in FIG. 6, the encountered soil itself will lift the lower end of the conveyor means 62' and the lateral bar 93 will, as a consequence, move relatively upwardly in the slots 95, as shown in the latter figure. If, thereafter, the soil load decreases in depth, gravitational force will effect automatically a lowering of the upper conveyor means 62' towards its FIG. 5 disposition. The described slotted connection therefore provides a floating arrangement for the upper conveyor means 62' enabling the automatic accommodation of variable soil depth without interference with the ordinary functioning of the hydraulic ram means 92'.

In order to maximize the variance in soil depths which can be handled by the modified embodiment of the invention disclosed in FIGS. 5 and 6 the upper conveyor means 62' is made longer than the conveyor means 62 described in conjuntcion with the first embodiment of the invention. More particularly, as most clearly shown in FIG. 5, the lower extremity of the conveyor means 62' extends beyond the lower cutting edge 36' of the scraper blade 34'. More precisely, the conveyor means 62' extends sufficiently beyond the cutting edge 36' of the blade 34' so that the transverse conveyor blades 81' attain a perpendicular relationship to the scrapper blade 34' as they move adjacent to the cutting edge 36'. As a consequence, even if a soil depth of but two inches is being scraped and loaded, the conveyor blades 81' move the thin layer of soil or earth upwardly along the entire length of the scraper blade 34', thus to minimize the load encountered by the scraper blade.

The slotted connection between the hydraulic ram means 92' and the conveyor means 62' in the second embodiment of the invention shown in FIGS. 5 and 6 enables yet further application of a conveyor type loader, as generally described hereinabove, to remove not only loose earth but also to perform in sequence a digging and loading operation. Such modified arrangement is shown in FIGS. 7 and 8 which again incorporate structural changes substantially only in the upper conveyor means which in such third embodiment of the invention is indicated at 62". All corresponding elements of this third embodiment are similarly differentiated from the prior embodiments by the addition of a double prime notation to the numbers in FIGS. 7 and 8.

More particularly, the upper conveyor means 62" is generally similar to that shown on the other embodiments of the invention and is connected for positive pivotal motion about its upper mounting shaft 114" by a slot 95" and bar 93" connected to a hydraulic ram means 92".

To perform a digging function prior to loading, each of the conveyor blades 81" has mounted thereon a plurality of outwardly-projecting cutting teeth 83 located at spaced intervals along its transverse length, as most clearly shown in FIG. 8. The cutting teeth 83 are equally spaced on each of the conveyor blades 81" but are arranged in staggered relationship on adjacent blades. More particularly, the cutting teeth 83 on each successive blade 81″, disposed upwardly and to the right as viewed in FIG. 8, are displaced laterally so as to encounter earth or soil laterally adjacent to that encountered by the teeth on the previous blade. The lateral staggering is such that every fourth blade 81″ has its cutting teeth 83 mounted in alignment in the direction of conveyor motion. Such staggered tooth arrangement minimizes the power requirement necessary for a digging operation, but, at the same time, assures that all soil across the entire lateral width of the upper conveyor means is encountered by some of the cutting teeth during operation.

It will be apparent that the cutting teeth 83 can be utilized to engage and perform a digging function on a horizontal layer of soil encountered by the scraper blade 34″, and the loading operation will thereafter be performed in substantially the manner described in detail in connection with the first embodiment of this invention.

In addition, however, as specifically shown in FIG. 7, the described slotted connection at the upper end of the conveyor means 62″ allows a digging and loading operation to be performed on a vertical bank, indicated at B. The upper conveyor means 62″ can be first lifted by retraction of the hydraulic ram means 92″ until outer end of the conveyor means 62″ lies at the top of a vertical bank of soil. Energization of the upper and lower conveyor means 62″ and 60″ will instigate digging and subsequent loading of the soil from the upper portion of the bank; and as soil is removed by the cutting teeth 83 and the conveyor blades 81″, the outer end of the conveyor means 62″ will automatically drop, under gravitational force, to continue the digging and loading operation down the vertical bank. Obviously, hydraulic pressure in the ram means 92″ can be relieved to enable such gravitational motion of the conveyor means 62″.

Yet many further modifications and alterations can be made without departing from the spirit of the present invention, and accordingly, the foregoing description of several embodiments is to be considered as purely exemplary and not in a limiting sense.

What is claimed is:
1. A conveyor type loader comprising:
 (a) a vehicular body including a forward movable traction means and a rigid support frame carried by said traction means;
 (b) first conveyor means, including a plurality of first conveyor blades rigidly mounted to said support frame and extending rearwardly and upwardly;
 (c) second conveyor means mounted to said support frame and including a plurality of second conveyor blades forming a single endless loop assembly, said second conveyor means being of a length to completely overlie said first conveyor means and to extend downwardly below the lower end portion of said first conveyor means, said first and second conveyor means being spaced from one another such that the outer edges of the first and second conveyor blades near the upper end portion of said first and second conveyor means are in close proximity; and
 (d) common drive means coupled to said first and second conveyor means to move adjacent first and second conveyor blades in the same direction with the same speed and independently of the forward motion of said support frame,
  the upper end portion of said second conveyor means being hingeably supported in said support frame and in which means are provided between said second conveyor means and support frame to change the inclination of said second conveyor means with respect to said first conveyor means between a first position in which said second conveyor means is substantially parallel to saaid first conveyor means and a second position in which said second conveyor means forms an acute angle relative to said first conveyor means,
  said inclination changing means for said second conveyor including a slotted connection providing a lost motion mechanism enabling limited pivotal motion of said second conveyor about its hingeable support.

References Cited
UNITED STATES PATENTS

| | | | |
|---|---|---|---|
| 24,816 | 7/1859 | Morrell | 37—102 |
| 1,090,418 | 3/1914 | Schneider | 198—8 |
| 1,157,209 | 10/1915 | Converse | 37—101 |
| 1,381,211 | 6/1921 | Maulsby. | |
| 1,527,652 | 2/1925 | Kasuske | 198—13 |
| 1,533,901 | 4/1925 | Ronning et al. | 37—102 |
| 2,696,287 | 12/1954 | Foust | 198—8 |
| 3,030,714 | 4/1962 | Sassmann et al. | |

FOREIGN PATENTS 28,292    5/1908    Sweden.

ROBERT E. BAGWILL, Primary Examiner

A. E. KOPECKI, Assistant Examiner

U.S. Cl. X.R.

198—8